(12) United States Patent
Wade et al.

(10) Patent No.: US 8,099,371 B1
(45) Date of Patent: Jan. 17, 2012

(54) ELECTRONICALLY ENABLED CLEARANCE METHODOLOGY FOR IMPROVED PROCESSING AT BORDER CROSSINGS

(75) Inventors: Kevin Wade, Plain City, OH (US); Tamara Koenig, Spencerville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 425 days.

(21) Appl. No.: 12/126,693

(22) Filed: May 23, 2008

(51) Int. Cl.
*G06Q 30/00* (2006.01)

(52) U.S. Cl. ........................................... 705/331
(58) Field of Classification Search .................. None
See application file for complete search history.

(56) References Cited

U.S. PATENT DOCUMENTS

| | | | |
|---|---|---|---|
| 6,526,443 B1 | 2/2003 | Goldsmith et al. | |
| 6,973,385 B2 | 12/2005 | Ulrich | |
| 7,002,472 B2 | 2/2006 | Stratmoen et al. | |
| 7,012,520 B2 | 3/2006 | Webb, Sr. | |
| 7,012,529 B2 | 3/2006 | Sajkowsky | |
| 7,283,052 B2 | 10/2007 | Bohman et al. | |
| 2002/0120561 A1 | 8/2002 | Chin et al. | |
| 2003/0069831 A1 | 4/2003 | Le et al. | |
| 2003/0192947 A1 | 10/2003 | Toedtli | |
| 2003/0195815 A1* | 10/2003 | Li et al. | 705/26 |
| 2003/0212607 A1* | 11/2003 | Chu et al. | 705/26 |
| 2005/0073434 A1 | 4/2005 | Arquette et al. | |
| 2005/0075899 A1 | 4/2005 | Corcoran et al. | |
| 2005/0110635 A1 | 5/2005 | Giermanski et al. | |
| 2005/0149453 A1 | 7/2005 | Amling et al. | |
| 2005/0251404 A1* | 11/2005 | Pento et al. | 705/1 |
| 2006/0106718 A1 | 5/2006 | Spellman et al. | |
| 2007/0120673 A1 | 5/2007 | Rajapakse et al. | |
| 2007/0203768 A1 | 8/2007 | Adra | |
| 2008/0255864 A1* | 10/2008 | Aubuchon et al. | 705/1 |

OTHER PUBLICATIONS

"Shifting into the fast lane", Automatic I.D. News, v14n4, Apr. 1998.*
"Transportation and logistics: It doesn't have to be a jungle adventure", Automatic I.D. News, Oct. 1997.*

* cited by examiner

*Primary Examiner* — Rutao Wu
(74) *Attorney, Agent, or Firm* — Standley Law Group LLP

(57) ABSTRACT

An electronically enabled clearance system and method for improved border crossings. The system and method generate and manage an electronic manifest (e-manifest) and an electronic commercial invoice (e-release) according to legal requirements as well as the requirements of a manufacturer that imports goods from other countries. A third party logistics provider may facilitate the interactions between an importer of manufactured goods, a supplier, a carrier, and a broker by serving as intermediary and hosting computer applications that manage the flow of information. A commercial invoice provides details about the goods in a shipment. A shipment control number (SCN) is associated with each commercial invoice. The e-manifest for a vehicle lists every SCN for the parts shipments loaded on the vehicle and therefore, provides a link to the commercial invoice data detailing information about the parts in the shipment.

20 Claims, 12 Drawing Sheets

Update Trip Details

Trip Header

| | |
|---|---|
| Status: On Time | |
| Trip ID: 29015817 | Carrier Pro Number: 398923 |
| Route Number: FL6-D00 | Power Unit: 406450 |
| Carrier SCAC: WWL | Conveyance: 3020 |
| Carrier Name: Whole World Logistics | Power Unit License Plate: 9999999 |
| Route Type: Truckload | Power Unit License State of Registration: XYZ |
| Lane Name: TRUCKLOAD | Conveyance License Plate: 1111111 |
| Trans Mode: Motor (Common Carrier) | Conveyance License Plate State of Registration: ABC |
| Previous Comments: | Comments: |

— 200

References | Contact Info

Reference Type: —Not Selected— ▽    Value: ____    [Add]    — 202

| Select | Reference Type | Value |
|---|---|---|
| ○ | Driver FAST ID | 12345678987654321 |
| ○ | Vehicle identity number | 12345678987654321 |

[Save]    [Delete]

[Cancel]

FIG-2A

Update Trip Details

Trip Header

Status: On Time
Trip ID: 29015817
Route Number: FL6-D00
Carrier SCAC: WWL
Carrier Name: Whole World Logistics
Route Type: Truckload
Lane Name: TRUCKLOAD
Trans Mode: Motor (Common Carrier)

Carrier Pro Number: 398923
Power Unit: 406450
Conveyance: 3020
Power Unit License Plate: 9999999
Power Unit License State of Registration: XYZ
Conveyance License Plate: 1111111
Conveyance License Plate State of Registration: ABC
Comments:

Previous Comments:

References | Contact Info

Driver Name: Wayne Driver
Driver Number:
Driver Contact Info:

Driver 2 Name:
Driver 2 Number:
Driver 2 Contact Info:

Dispatcher Name:

Save    Cancel

| | Route Name | Route Start Date | Trip ID | Trip Start Date (Scheduled) | Trip Start Date (Actual) | Default Carrier | Default Conveyance | Laneset |
|---|---|---|---|---|---|---|---|---|
| ☐ | Y01-D00 | 2/4/2008 | 30486258 | 2/4/2008 | | ONEW | 53' Trailer | 1860 |
| ☐ | Y01-X01 | 2/4/2008 | 30486516 | 2/4/2008 | | ONEW | 53' Trailer | 1860 |
| ☐ | Y01-X02 | 2/4/2008 | 30486509 | 2/4/2008 | | ONEW | 53' Trailer | 1860 |
| ☐ | Y01-X03 | 2/4/2008 | 30486510 | 2/4/2008 | | ONEW | 53' Trailer | 1860 |
| ☐ | Y01-X04 | 2/4/2008 | 30486261 | 2/4/2008 | | ONEW | 53' Trailer | 1860 |
| ☐ | Y01-X05 | 2/4/2008 | 30486260 | 2/4/2008 | | ONEW | 53' Trailer | 1860 |
| ☐ | Y01-X06 | 2/4/2008 | 30485812 | 2/4/2008 | 2/4/2008 | ONEW | 53' Trailer | 1860 |
| ☐ | Y01-X07 | 2/4/2008 | 30486138 | 2/4/2008 | | ONEW | 53' Trailer | 1860 |
| ☑ | Y01-X08 | 2/4/2008 | 30486134 | 2/4/2008 | 2/4/2008 | ONEW | 53' Trailer | 1860 |
| ☐ | Y01-X09 | 2/4/2008 | 30486137 | 2/4/2008 | 2/4/2008 | ONEW | 53' Trailer | 1860 |
| ☐ | Y01-X10 | 2/4/2008 | 30486136 | 2/4/2008 | | ONEW | 53' Trailer | 1860 |
| ☐ | Y01-X11 | 2/4/2008 | 30486135 | 2/4/2008 | | ONEW | 53' Trailer | 1860 |
| ☐ | Y01-X12 | 2/4/2008 | 30486314 | 2/4/2008 | | ONEW | 53' Trailer | 1860 |
| ☐ | Y01-X13 | 2/4/2008 | 30484564 | 2/4/2008 | | ONEW | 53' Trailer | 1860 |
| ☐ | Y01-X15 | 2/4/2008 | 30484562 | 2/4/2008 | | ONEW | 53' Trailer | 1860 |

Electronic Manifest

Trip Number: TIWT31297828

*TIWT31297828*

Driver's Name: WAYNE DRIVER

Truck License: XXX YY 1234PC

| Shipment Control Number | Shipment ID | BOL |
|---|---|---|
| TIWT12069536 | 00004188 | 000004188 |
| TIWT12069535 | 00004189 | 000004189 |
| TIWT12069534 | 00004190 | 000004190 |
| TIWT12069537 | 00004191 | 000004191 |

FIG-3B

| Commercial Invoice | | |
|---|---|---|
| Seller (Name, Address, Tax Reference)<br>Supplier A<br>1234 Main St.<br>Windsor, ON, N9A 6J3<br>CANADA<br><br>895316743RM0004 | Invoice Number:<br>2032100500111039 | Shipment Control Number:<br>TIWT117790595 |
| | Invoice Date (yyyy-mm-dd)<br>4/22/2008 9:31:00 AM | Seller's Reference:<br>ASN#: 00111039<br>Other Reference:<br>Broker ID:#112 |
| Consignee (Name, Address, Tax Reference)<br>Honda of America Manufacturing-MEI-2A/2E-MAP<br>11590 TWP RD 157<br>EAST LIBERTY, OH, 43319<br>USA      31-0925242 | Buyer (Name, Address, Tax Reference)<br>Honda of America Manufacturing<br>24000 Honda Parkway<br>Marysville, OH, 43040<br>USA      31-0925242 | |
| Freight Forwarder (Name, Address, Tax Reference) | Unique Consignment Reference<br>TIWT 30935630 | |
| | Country of Origin    ISO Code<br>CANADA           CA | Country of Destination   ISO Code<br>UNITED STATES        US |
| | Terms of Delivery<br>FOB Destination | Duty and Brokerage<br>Brokerage by FedEx Trade Network.<br>Duty for the Account of Honda of<br>America Manufacturing. |
| Party Related:    ☒ Y    ☐ N | Relevant Location | Terms of Payment    Transaction Currency<br>CC                  USD |
| Transport Mode and Carrier<br>J-MOTOR          Carrier X | Port/Airport of Loading | |
| Port/Airport of Discharge<br>3801 - DETROIT, MI | Final Place of Delivery | |

FROM FIG-3C

| Shipping Marks, Transport Unit ID | No. and Kind of Packages; Shipping Description of Goods | Commodity Code | Total Gross Wt(kg) 450.00 Total Net Wt(kg) 450.00 | | Total Cube(m3) | |
|---|---|---|---|---|---|---|
| | PKG | | | | | |

| Item/Packages 71123TE0 A000 | Ord# 117391 | Item Description COVERFR | Origin CA | Commodity Code 8708.29.5060 | Quantity 300 | Unit Weight 450 | Unit Price $7.09 | Amount $2,127.00 |
|---|---|---|---|---|---|---|---|---|

| Invoice Clauses | Total Amount (Gross) | $2,127.00 |
|---|---|---|
| | Discount | |
| | Delivery Charges | |
| | Tax | |
| | Total Amount Due | $2,127.00 |

FIG-3D

| Commercial Invoice | | |
|---|---|---|
| Seller (Name, Address, Tax Reference)<br><br>Supplier A<br>1234 Main St.<br>Windsor, ON, N9A 6J3<br>CANADA<br><br>89531674 3RM0004 | Invoice Number:<br>2032100600115106 | Shipment Control Number:<br>TIWT11790621 |
| | Invoice Date (yyyy-mm-dd)<br>4/22/2008 1:54:00 PM | Seller's Reference:<br>ASN#: 00115106<br>Other Reference:<br>Broker ID:#112 |
| Consignee (Name, Address, Tax Reference)<br>Honda of America Manufacturing—MEI-2A/2E-MAP<br>11590 TWP RD 157<br>EAST LIBERTY, OH, 43319<br>USA      31-0925242 | Buyer (Name, Address, Tax Reference)<br>Honda of America Manufacturing<br>24000 Honda Parkway<br>Marysville, OH, 43040<br>USA      31-0925242 | |
| Freight Forwarder (Name, Address, Tax Reference) | Unique Consignment Reference<br>TIWT 30935630 | |
| | Country of Origin    ISO Code<br>CANADA          CA | Country of Destination    ISO Code<br>UNITED STATES       US |
| Party Related: ☐ Y ☒ N | Terms of Delivery<br>FOB Destination | Duty and Brokerage<br>Brokerage by FedEx Trade Network.<br>Duty for the Account of Honda of<br>America Manufacturing. |
| Transport Mode and Carrier<br>J-MOTOR       Carrier X | Port/Airport of Loading | |
| Port/Airport of Discharge<br>3801 – DETROIT, MI | Final Place of Delivery | Relevant Location    Terms of Payment    Transaction Currency<br>                       CC                  USD |

FROM FIG-3E

| Shipping Marks, Transport Unit ID | No. and Kind of Packages; Shipping Description of Goods | Commodity Code | Total Gross Wt(kg) 3544.00 | Total Cube(m3) |
| --- | --- | --- | --- | --- |
| | PKG | | Total Net Wt(kg) 3544.00 | |

| Item/Packages | Ord# | Item Description | Origin | Commodity Code | Quantity | Unit Weight | Unit Price | Amount |
| --- | --- | --- | --- | --- | --- | --- | --- | --- |
| 74895TA5 A012M1 B536P | 109066 | GARN ASSY TRUNK LWR | CA | 8708.29.5060 | 24 | 61.6348 | $2.22 | $53.33 |
| 74895TA5 A012M1 G530M | 109066 | GARN ASSY TRUNK LWR | CA | 8708.29.5060 | 24 | 61.6348 | $6.76 | $162.14 |
| 74895TA5 A012M1 YR574M | 109066 | GARN ASSY TRUNK LWR | CA | 8708.29.5060 | 143 | 367.2406 | $8.94 | $1,279.14 |
| 74895TA5 A012M1 B92P | 109066 | GARN ASSY TRUNK LWR | CA | 8708.29.5060 | 193 | 495.6464 | $3.46 | $667.01 |
| 74895TA5 A012M1 NH700M | 109066 | GARN ASSY TRUNK LWR | CA | 8708.29.5060 | 280 | 719.0724 | $1.23 | $345.52 |
| 74895TA5 A012M1 NH578 | 109066 | GARN ASSY TRUNK LWR | CA | 8708.29.5060 | 292 | 749.8898 | $2.35 | $684.74 |
| 74895TA5 A012M1 NH737M | 109066 | GARN ASSY TRUNK LWR | CA | 8708.29.5060 | 424 | 1088.8811 | $5.23 | $2,219.22 |

| Invoice Clauses | Total Amount (Gross) | $5,411.09 |
| --- | --- | --- |
| | Discount | |
| | Delivery Charges | |
| | Tax | |
| | Total Amount Due | $5,411.09 |

FIG-3F

Manifest – View Standard Manifest

| Print | Print Cover Sheet | Edit | Cancel Manifest & Shipment(s) | Cancel Manifest but Keep Shipment(s) |

Trip Information
Carrier SCSC: ONEW   Carrier name:   ACE ID: 0000109962   Filing status: CD
Manifest preparer: CUOT
Trip #: ONEW29034085
Est. date of arrival at first port in U.S: 09/20/2007
Est. time of arrival at first port in U.S: 10:15
First expected port of arrival: 3801-DETROIT, MI
In-transit indicator: No

Conveyance
Conveyance ID: AB-F34414

Instruments of International Traffic:

Crew member(s)

| In Charge | Last Name | First Name | Middle Name | Suffix | ID | CDL#/License# | FAST ID |
|---|---|---|---|---|---|---|---|
| Yes | – | – | – | – | – | – – – | 42700028921701 |

FROM FIG-4A

Passenger(s)

| Last Name | First Name | Middle Name | Suffix |
|---|---|---|---|

Equipment(s)

| Equip#/License Plate# | Type | Seal Number(s) |
|---|---|---|
| 3043ME-1330320 | Trailer, NSF | |

Shipment(s)

| Shipment Control # | Bill Control | Preparer | Sequence # | Total Shipment Quantity |
|---|---|---|---|---|
| ONEW000121323 | | CUOT | | 2640.0 |
| ONEW000121310 | | CUOT | | 360.0 |
| ONEW000121320 | | CUOT | | 540.0 |
| ONEW000121322 | | CUOT | | 540.0 |
| ONEW000121324 | | CUOT | | 8220.0 |
| ONEW000121321 | | CUOT | | 240.0 |
| ONEW000121315 | | CUOT | | 1440.0 |
| ONEW000121312 | | CUOT | | 480.0 |
| ONEW000121314 | | CUOT | | 660.0 |

OK

400

FIG-4B

ELECTRONICALLY ENABLED CLEARANCE METHODOLOGY FOR IMPROVED PROCESSING AT BORDER CROSSINGS

CROSS REFERENCES TO RELATED APPLICATIONS

None.

TECHNICAL FIELD OF THE INVENTIVE FIELD

The present invention is directed to system and methods for creating and managing customs documents for imported goods. In particular, the present invention is directed to a system and method for improved processing at border crossings that generates and manages an electronic manifest (e-manifest) and an electronic commercial invoice (e-release) according to legal requirements as well as the requirements of a manufacturer that imports goods from other countries.

BACKGROUND OF THE INVENTIVE FIELD

U.S. Customs and Border Protection, or CBP, requires buyers of goods from other countries to provide appropriate documentation upon entry of the purchased goods into the U.S. The documentation typically includes a commercial invoice with additional customs data to declare the goods and provide information such as the identity and location of the buyer and seller, the type of goods, the quantity of goods, and the country of origin. The customs information in the commercial invoice further includes a customs classification and a customs value for the purchased goods. The customs information allows the customs agent to determine whether duties for the imported goods must be collected and whether fair trade provisions apply to the imported goods. The commercial invoice is typically generated by the supplier of the goods in connection with the sale of goods to the importing manufacturer.

Another document that CBP requires is an electronic manifest (e-manifest) received through the CBP's Automated Commercial Environment (ACE). ACE is the CBP web-accessible computerized system designed to provide agents with information about goods transported across borders. The e-manifest not only provides information about the commercial transaction between the buyer and the seller; it also provides information about the carrier and driver, crew, or passengers and the vehicle used to transport the goods across the border. It provides a CBP agent with information to pre-screen the driver, crew, passengers, conveyance, equipment, and shipment information before the vehicle actually arrives at the border. The e-manifest is typically prepared and electronically submitted to ACE by the carrier of the imported goods.

Buyers of imported goods typically rely on their suppliers to produce commercial invoices because they are the parties that manufacture the goods and work with the carriers to transport the goods. Buyers may further rely on their carriers to produce e-manifests because they are the parties that transport the goods across the border. Inaccuracies in these documents, however, can be costly to the buyer. For example, the e-manifest must comply with CBP requirements. If the e-manifest has inaccurate information, the shipment of goods to the buyer may be delayed. If the goods are used by the buyer in manufacturing, the buyer's production may be delayed until the goods are released resulting in a monetary loss to the buyer.

Accuracy of the commercial invoices is also important. If the commercial invoice fails to identify the appropriate customs classification and customs value of the goods, the buyer may overpay or underpay the applicable duty. Therefore, it is important to the buyer that the commercial invoices have accurate information. The buyer may in fact, have corporate policies that its suppliers should follow in preparing commercial invoices to reduce the occurrence of errors.

In addition to generating accurate custom documents, it is important for custom documents to be generated in timely manner. CBP requires the e-manifest at least one hour in advance of the vehicle's arrival at the border so that an agent can complete pre-screening. Delays in arrival of the required documents can be as costly for the manufacturer as inaccurate information. If transportation of the goods is delayed for any reason, the buyer's production may be delayed until the goods are released resulting in a monetary loss to the buyer.

There are third party services that assist buyers and their suppliers with the process of generating electronic customs documents and transmitting the documents to the CBP in advance of a vehicle's arrival at the border. The services, however, typically use proprietary technology for generating the custom documents and typically do not import electronic information into their systems. Instead, they accept faxes or other forms of documentation from a supplier or other source and then key the necessary data into their proprietary computer program for generating the custom documents. The manual entry of data, however, is time-consuming and error-prone and may be a source of the inaccuracies in the generated customs documents. Furthermore, the manual data entry process requires a substantial amount of lead time to allow the service enough time to receive and enter the data as well as ensure that the documents arrive at the CBP at least three hours in advance of the vehicle.

Customs documentation processes that require a substantial lead time are inefficient and costly, especially for a manufacturer that practices just-in-time (JIT) inventory management. Suppliers that provide imported goods for the (JIT) manufacturer must account for the lead time required to produce the customs documents that are needed in advance of the border crossing. The lead time determines when information must be available to generate the customs documents, and therefore, impacts the supplier's start of production and the amount of time the parts are maintained in inventory (e.g., at the supplier's facility or in transit). A reduction in the lead time that is required to generate the customs documents can reduce the amount of time the parts are maintained in inventory, and therefore, the JIT manufacturer's costs.

There is a need for a methodology to facilitate border crossings by generating documents that conform to import requirements as well as a buyer's corporate requirements. There is a need for a methodology that generates accurate and timely customs documents thereby facilitating border crossings by reducing delays at border crossings. There is a need for a methodology that reduces the lead time to generate customs documents thereby reducing the lead time needed by suppliers to produce goods.

SUMMARY OF THE GENERAL INVENTIVE CONCEPT

The present invention is directed to a system and method for improved processing at border crossings using an electronically enabled clearance methodology. The system and method generate and manage an electronic manifest (e-manifest) and an electronic commercial invoice with customs data (e-release) according to legal requirements as well as the requirements of a manufacturer that imports goods from other countries. The system and method integrate the interactions of an importer of manufactured goods, a supplier, a carrier, and a broker to reduce the time needed to generate and transmit custom clearance documents for border crossings and to increase their accuracy. A third party logistics provider (3PL)

may further facilitate the interactions between the parties by serving as intermediary and hosting computer applications that manage the flow of information. The 3PL receives current price catalog data from the manufacturer and stores it in a database for reference during generation of the electronic documents used for the border crossing. The price data relates to parts that the suppliers produce for the importer manufacturer. The manufacturer orders parts from the suppliers and when the parts are ready to ship, the supplier sends an advance shipping notice to the manufacturer. The process of generating an electronic manifest (e-manifest) as well as an electronic commercial invoice (e-release) that meet the CBP requirements for a border crossing then begins. Following an electronic flow of information between the parties, the e-manifest and e-release are transmitted to or made available to the CBP in advance of a vehicle's arrival. A CBP agent and CBP systems review the e-manifest and e-release to confirm the documents comply with CBP requirements. A notification (CBP E-Accept and Release) is sent to the 3PL party when the vehicle and parts are cleared for crossing. The 3PL party then notifies the manufacturer of the vehicle's release.

A shipment control number (SCN) is used to link e-release data with the e-manifest. Every commercial invoice provides details about the parts in a shipment. A SCN is associated with each commercial invoice. The e-manifest for a vehicle lists every SCN for the shipments of supplies loaded on the vehicle and therefore, provides a link to the e-release data detailing information about the parts in the shipment.

BRIEF DESCRIPTION OF THE DRAWINGS

FIGS. 2A-B are example "Update Trip Details" screens for a trip detail application.

FIGS. 3A-3F are example "trip recap" screens for a trip detail application.

FIGS. 4A-C are sample screens from a CBP application.

DETAILED DESCRIPTION OF EXEMPLARY EMBODIMENT(S)

Figure 1:
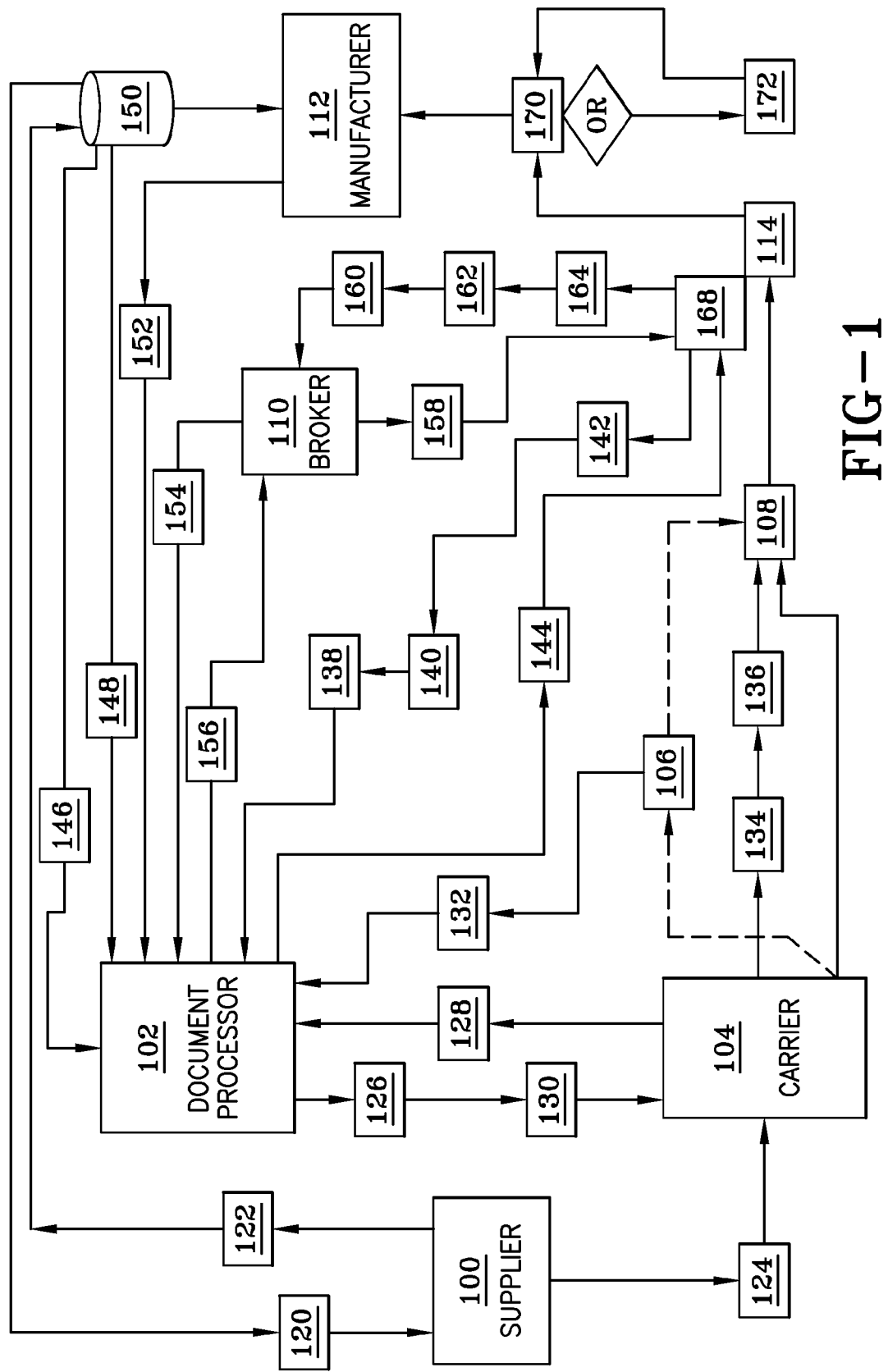
FIG. 1 is a block diagram illustrating the flow of information according to an example embodiment of the system and method.

Referring to FIG. 1, a block diagram illustrating the flow of information according to an example embodiment of the system and method is shown. In the example shown, electronic information and data flows between a supplier 100, a 3PL document processor 102, a carrier 104, a broker 110 that submits commercial invoices with additional customs data (e-release) to the CBP to gain customs clearance of the parts on behalf of an importer/manufacturer 112. Certain parts may flow through a cross-dock 106 where they are received and then processed for reshipment across the border. Communications and data exchanges between the various computer systems may be completed using communication links such as TCP/IP connections or equivalents. Communications and data exchanges may also be accomplished by posting data to a portal at one computer and allowing users and/or other computer systems to access the data.

Prior to the completion of an electronic document transaction, the parties exchange information and data to facilitate the transaction data flow. The manufacturer maintains computer systems and databases 150 to facilitate EDI transactions with its suppliers and other parties involved in the electronic documentation process. The e-manifest and e-release generated according to the system and method are linked by a Shipment Control Number (SCN) assigned to each shipment of parts. The 3PL document processor assigns SCN numbers to shipments when it receives advance shipment notifications from suppliers.

Example data for an e-manifest is summarized in Table 1.

TABLE 1 e-manifest Data

| Field | Description |
|---|---|
| Standard Carrier Alpha Code | Carrier's SCAC Code |
| Transportation Method Type Code | Code for method of transport for the trip (J = Truck) |
| Trip Number | Trip Number Assigned by document processor that defines Origination and Destination Points |
| Manifest Type Code | Identifies the type of manifest (P—Preliminary, W—Original, T—Intransit, Y—Amendment, 3—Delete) |
| Tractor Vehicle Identification Number | VIN # of truck for trip |
| Tractor License Plate | License plate number of truck for trip |
| Tractor License Plate Country of Registration | Country where the license plate is registered |
| Motorized Equipment Type Code | Describes motorized equipment used to pull the shipment (TR = Tractor) |
| Type of Communication Level | Describes level of communication (CNV—Conveyance) |
| Tractor License Plate Country Subdivision | State/province code where the license plate is registered for truck |
| Qualifier for Type of Personnel | Identifiers to define who is in the truck at the time of border crossing (EJ—person in charge, CRW—crew member, QF—passenger) |
| Name - Last | Last Name of Driver or Passenger(s) (sent if ACE or FAST # not sent) |
| Name - First | First Name of Driver or Passenger(s) (sent if ACE or FAST # not sent) |
| Name - Middle | Middle Name of Driver or Passenger(s) (sent if ACE or FAST # not sent) |
| Qualifier for FAST or ACE ID's | Identifier that describes whether ACE ID or FAST ID #s are being sent (A7 (ACE ID), PY (FAST Proximity Card ID)) |
| ACE ID or FAST ID Identifier Numbers | ACE or FAST ID of Driver or Passenger(s) |
| Address Information of Personnel | Street Address of Driver or Passenger(s) |

TABLE 1-continued e-manifest Data

| Field | Description |
|---|---|
| City Name of Personnel | City for address of Driver or Passenger(s) |
| Zip Code for Address | Zip code for address of Driver or Passenger(s) |
| Country Code of Personnel | Country for address of Driver or Passenger(s) |
| State or Province of Personnel | State/Province Code for address of Driver or Passenger(s). |
| Port Code for Conveyance Arrival | U.S. Port where the truck will cross\U.S. border. |
| Date of Arrival at Port | Estimated date of arrival at port for trip (CCYYMMDD). |
| Time of Arrival at Port | Estimated time of arrival at port for trip (CCYYMMDD) - EST/EDT. |
| Bill of Lading | Bill of Lading Number for a shipment (supplier(s) can have multiple BOL) |
| SCN # | Shipment Control Number for BOL. Links the e-manifest with the e-release |
| Foreign port of loading | Port (Province) where the freight was loaded for BOL |
| Manifest Unit Code | Level of Manifest Definition (= Package) for BOL |
| Weight | Gross Weight of Product on Bill of Lading |
| Qualifier for Weight Unit | K—Kilograms, L—Pounds |
| Shipper Name | Name of shipper |
| Address Information for Shipper | Street address of shipper |
| City Name - Shipper | Name of city where shipper is located |
| Postal Code - Shipper | Zip code for address of shipper |
| Country Code - Shipper | County where shipper is located |
| Country Subdivision - Shipper | State/Province Code where shipper is located |
| Consignee Name | Name of consignee |
| Address Information for consignee | Street address of consignee |
| City Name - consignee | Name of city where consignee is located |
| Postal Code - consignee | Zip code for address of consignee |
| Country Code - consignee | County where consignee is located |
| Country Subdivision - consignee | State/Province Code where consignee is located |
| broker Name | Name of broker |
| Address Information for broker | Street address of broker |
| City Name - broker | Name of city where broker is located |
| Postal Code - broker | Zip code for address of broker |
| Country Code - broker | County where broker is located |
| Country Subdivision - broker | State/Province Code where broker is located |
| Equipment Description Code | Code to describe equipment used for cargo (TL = semitruck trailer) |
| Equipment Number - Trailer # | Trailer number for shipment |
| Trailer License Plate | License plate of trailer for trip |
| Country Subdivsion - Trailer | State/province code where license plate is registered for trailer |
| Quantity | Number of packages on the trailer |
| General Description of the Cargo | Default = "New Auto Parts" |
| Qualifier for Weight Unit | Qualifier for weight (G—Grams, K—Kilograms, L—Pounds, O—Ounces, T—Tons) |
| Weight | Total gross weight for all BOLs in the trailer |
| Manifest Unit Code | Type of Packaging Used in Quantity (type = "package") |
| Country Code | Country of origin where parts were manufactured. |

Example data for an e-release is summarized in Table 2.

TABLE 2 e-release Data

| Field | Description |
|---|---|
| Date | Date of invoice |
| Invoice Number | Invoice number |
| Currency | Type of currency used in invoice |
| Country of Export | Country where the goods are being exported from |
| Bill of Lading # | Bill of lading number associated with shipment |
| SCN # | Shipment Control Number - assigned by document processor; unique number preceded by SCAC code |
| Shipper Name | Name of company shipping goods |
| Shipper Tax ID # | Tax ID number of company shipping goods |
| Ship-to Name | Name of company where goods are being shipped |
| Ship-to Tax ID # | Tax ID number of company where goods are being shipped |
| Buyer Name | Name of buyer of goods |
| Buyer Tax ID # | Tax ID number of buyer of goods |
| Party Affiliate Relationship | Describes whether the parties are affiliated with each other |
| Bill to Party Name - Brokerage Fees | Name of party responsible for paying brokerage fees |
| Bill to Party Tax ID # | Tax ID number of bill to party |
| Importer of Record Name | Name of the importer of record |

TABLE 2-continued e-release Data

| Field | Description |
|---|---|
| Importer of Record Tax ID # | Tax ID number of importer of record |
| Ship Date | Date parts were shipped |
| Ship Time | Time parts were shipped |
| Import Date | Date of import of goods |
| Export Date | Date of export of goods |
| Shipment Method of Payment | Method of payment for shipment of goods (e.g., CC) |
| General Description of Freight | General freight description (default = new auto parts) |
| Carrier Name | Name of carrier transporting freight |
| Carrier SCAC Code | SCAC code of carrier transporting freight |
| Code Qualifier for Method of Transport | Defines method of transport (J = motor) |
| Port Code | Port of entry code where goods enter country |
| FIRMS Code | Code for U.S. Customs Location |
| Item Number | Part number(s) |
| Item Quantity | Quantity of parts being shipped |
| Item Unit of Measure | Unit of measure for the quantity of parts |
| Item Unit Price | Unit price for the items being shipped |
| Item Country of Origin | Country where goods were manufactured |
| Harmonized Tariff System Classification | Code assigned to parts based on U.S. Customs categorization |
| NAFTA Eligibility | Defines whether parts are eligible under the North America Free Trade Agreement |
| Line Net Weight | Net weight of the invoice line item |
| Item Description | General freight description (default = new auto parts) |
| Total Value of Item | Extended value of item where quantity is multiplied by unit price |
| Total Invoice Amount | Total amount on the invoice = sum of invoice line totals |
| Total Package Count | Total number of packages |
| Basis of Packaging | Type of packages (default = package) |
| Total Gross Weight | Total gross weight on shipment |
| Weight Qualifier | Weight qualifier for shipment gross weight |

Pre-trip data flows and setup are summarized in Table 3 and include the following:

TABLE 3

Pre-Trip Data Flows

| From | To | Data |
|---|---|---|
| Manufacturer | 3PL Document Processor | Price Catalog Data 148<br>3PL Document processor receives, processes, and stores commercial part level price data for parts ordered from suppliers. Price data is used to determine value of parts in shipments and is included in e-release to determine applicable duty to be paid at crossing. Price data may include effective and expiration dates that indicate when data updates are required. |
| Manufacturer | 3PL Document Processor | Manufacturer Trade Compliance Data 152<br>Trade compliance data such as harmonized system codes (HS codes), NAFTA eligibility, relationship, and tax identification data. |
| 3PL | Carrier | Route Details 126 |

TABLE 3-continued

Pre-Trip Data Flows

| From | To | Data |
|---|---|---|
| Document Processor | | Route detail data provides carrier with trip information for receiving and delivering parts shipments from various suppliers to manufacturer. Some supplies may be shipped though a cross-dock and require driver make a stop at the cross-dock. |

At the CBP 114, agents use a computer 168 to access the electronic customs documents. The e-manifest is accessible through the Automated Commercial Environment (ACE) system while the e-release is accessible through the Automated Commercial (ACS) System. The Automated Broker Interface (ABI) is a component of the U.S. Customs Service's Automated Commercial System that permits qualified participants to electronically file required import data with Customs.

The methodology for generating custom documents is summarized in Table 4. The reference numerals relate to items in FIG. 1 and are used to illustrate the steps of the electronic documentation generation process and flow of data and information.

TABLE 4

Electronic Documentation Generation

| Reference | From | To | Data |
|---|---|---|---|
| 128 | Carrier | 3PL Document Processor | Conveyance Crew and Equipment<br>Carrier provides document processor with data regarding vehicles, equipment, and |

TABLE 4-continued

Electronic Documentation Generation

| Reference | From | To | Data |
|---|---|---|---|
| | | | drivers/crews/passengers that will provide supply transportation services to manufacturer. Drivers may be required to have certain certifications and qualifications that support expedited processing at border crossings.<br>Each trip that crosses a border is assigned a trip number. |
| 122 | Supplier | Manufacturer | Advance Shipment Notice (ASN) EDI 856 146<br>When parts ordered by manufacturer are ready to be shipped, supplier issues an advance shipment notice to manufacturer. (Manufacturer may respond with application advice transaction 120.)<br>ASN triggers generation of e-manifest and e-release. |
| 132 | Cross Dock | 3PL Document Processor | Change of Conveyance for ASN<br>Conveyance data at the document processor may be updated by cross-dock or document processor. |
| 130 | 3PL Document Processor | Carrier | Border Summary Sheet and Commercial Invoice<br>Carrier accesses document processor electronic document computer system and prints border summary sheet (BSS) for vehicle driver. BSS provides a subset of the e-manifest such as: trip number, driver name, truck license, SCN numbers, Bill of Lading number and other supporting data. |
| 144 | 3PL Document Processor | CBP | e-Manifest EDI 309 (Electronic Manifest)<br>Accessed by CBP agent through ACE computer system. Provides complete list of shipments loaded in vehicle as identified by SCNs. SCNs link to commercial invoices that provide part details for each shipment on the vehicle. |
| 138 | CBP | 3PL Document Processor | e-manifest Acknowledgement EDI 997<br>CBP sends acknowledgment of receipt of e-manifest to document processor with applicable syntax errors if detected. |
| 156 | 3PL Document Processor | Broker | e-release EDI 810 (Commercial Invoice)<br>Document processor transmits electronic commercial invoice (e-release) to broker. Document contains all the necessary information to gain clearance from the CBP. Data includes, part numbers, quantities, pricing, HScodes, and other supporting data. |
| 154 | Broker | 3PL Document Processor | e-release Acknowledgement EDI 997<br>Broker sends acknowledgment of receipt of e-release to document processor with applicable syntax errors if detected. |
| 140 | CBP | 3PL Document Processor | e-manifest Accept/Reject EDI 355<br>CBP sends notice to document processor on status of accepting or rejecting e-manifest. |
| 160 | CBP | Broker | Copy of the e-manifest sent to the broker. |
| 158 | Broker | CBP | 7501 Data (Commercial Invoice plus additional information)<br>Broker converts the 810 and adds data that then provides the information to the CBP through the ABI data transaction set-7501. |
| 162 | CBP | Broker | Acknowledgement<br>CBP sends notice to broker acknowledging receipt of e-release. |
| 134/136 | Carrier | Carrier Designated Location 108 | Border Summary Sheet and Commercial Invoice<br>Carrier goes to designated location to obtain paper copies of BSS and commercial invoices. |
| 142 | CBP | 3PL Document Processor | Arrival and Release/Hold EDI 350<br>CBP sends a first notice to document processor when the vehicle arrives at the border. CBP reviews e-manifest and e-release to confirm compliance with requirements. CBP sends a second notice to document processor indicating whether the vehicle has been released or held. |
| 164 | CBP | Broker | Status Information<br>Status information is returned from CBP to broker via ABI. |
| 170/172 | CBP | Manufacturer | Physical Release or Hold/Examine<br>CBP determination/action whether vehicle will be released, held for examination, or returned to originating country. |

Several support transactions occur in connection with the electronic document methodology. The support transactions are summarized in Table 5.

TABLE 5

Support Transactions

| Reference | From | To | Data |
|---|---|---|---|
| 120 | Manufacturer | Supplier | Application Advice EDI 824 Manufacturer transmits an application advice notice in response to receiving an ASN from a supplier. |
| 124 | Supplier | Carrier | Goods/Master Packing List (MPL)/ Bill of Lading (BOL) Supplier provides truck driver with parts to be transported, a master packing list, and a bill of lading. |

Servers and related server applications operable at the supplier, manufacturer, carrier, broker, document processor, and CBP sites support electronic communications between the parties. Transactions between the parties conform to EDI and Internet standards.

Web-based applications support user interfaces to the electronically enabled clearance methodology of the present invention. The application may provide a user with various screens to access and view details regarding a specific trip. Information for each trip that is stored and maintained by the application may include current status information, a trip number, a route number, a carrier identifier, a scheduled start/end date and time, and an actual start/end date and time. The application may allow a user to enter various filter criteria (e.g., complete trips, non-complete trips, etc.) to apply to detailed trip data to locate trips and to change the data presented on a screen.

Referring to FIG. 2A, an "update trip details" screen for a trip detail application is shown. A user can update details for the power unit, conveyance, power unit license plate, power unit license state of registration, conveyance license plate, and conveyance license plate state of registration 200. A user can also enter reference information 202. References may include information about various certifications or qualifications that a driver may have to expedite border crossings, vehicle information, etc. A type may be associated with each item of information and may include "crew ACE ID," "crew FAST ID," "driver ACE ID," "driver FAST ID," "passenger ACE ID," "passenger FAST ID," "seal number," and "vehicle identity number." Driver contact information 204 may be updated as shown in FIG. 2B.

Driver procedures are summarized in Tables 6 and 7.

TABLE 6

Driver Procedure for Cross-Dock Carriers

1. Upon arrival at supplier, driver receives from supplier Master Packing List (MPL), Bill of Lading (BOL)
2. Driver confirms that each MPL (associated with ASN) has a corresponding commercial invoice and BOL. (Supplier provides this documentation for each shipment.)
3. Upon arrival at cross-dock, driver submits documentation to designated cross-dock associates.

TABLE 7

Driver Procedure for Carriers Crossing Border

1. Upon arrival at supplier, driver receives from supplier Master Packing List (MPL), Bill of Lading (BOL).
2. Driver confirms that each MPL (associated with ASN) has a corresponding commercial invoice and BOL. (Supplier provides this documentation for each shipment.)
3. Driver submits BOL(s) and commercial invoice(s) to the carrier dispatch.
4. Before departure from last stop, driver contacts dispatch for execution of departure through IVR or EDI.
5. After departure, carrier's dispatch ensures correct SCNs are on BSS, accessible via trip detail application. If any problem is identified, document processor is notified and problem is corrected.
6. If BSS is corrected, new commercial invoices are printed. If any problem is identified, document processor is notified and problem is corrected.
7. Driver obtains BSS and all commercial invoices for loaded shipments at a carrier designated location as determined by driver and dispatcher.
8. Driver verifies information on BSS and each commercial invoice is correct with driver, equipment, and customs information provided by the supplier:
9. If documents are correct, driver proceeds to border.

Referring to FIG. 3A, a "locate and print border summary sheet" screen is shown. Upon receiving notification from the driver that the departure from the last supplier has occurred and the driver has submitted the BOL(s) and commercial invoice(s) to dispatch, dispatch then locates and prints the BSS from the trip detail application. Using a "reports" drop-down menu located in a toolbar, the user selects a "trip recap & PUL" option. The user enters a date range (start and end dates) for a "get routes" option. Results are presented as shown in FIG. 3A. A list of routes matching the start and end dates is presented in alphabetical order. The user can select one or more routes by checking a box to the left of the appropriate route 300. A "Border Sheet" option 302 is located in the bottom left-hand corner of the screen. Selection of the option results in display of the BSS in report format as shown in FIG. 3B.

Selection of the "commercial invoice" option as shown on FIG. 3A results in display of the commercial invoice sheet. An example is shown in FIGS. 3C-3F.

Before the driver's departure for the border, the ACE manifest and ACE coversheet may be reviewed through the CBP ACE computer system. A carrier (driver or dispatch) can verify that all SCNs have been entered into the ACE computer system at least one hour before the driver arrives at the border as required by the CBP. E-manifest information is transmitted to the ACE computer system when all of the driver, truck, and tractor information have been entered on for the trip identifier and the BSS is confirmed to be correct. Example information includes:
  1. Tractor/trailer information including vehicle identification number (VIN) and license plate information.
  2. Driver information including certification numbers (e.g., FAST ID).
  3. Correct SCNS and supporting information on BSS.

A user accesses the ACE Secure Data computer system, logs in, and selects an option to access a manifest. Manifests can appear under three different categories of Filing Status:
  1. Completed—manifest has been accepted with no errors;
  2. Completed Amended—manifest has been accepted with no errors but information/arrival status has been changed;
  3. Preliminary—manifest has been partially accepted due to errors, and must be corrected to Completed or Completed Amended status.

Figure 4C:

The ACE application may allow a user to enter a trip number to locate a manifest. Trips meeting user specified criteria are displayed. The e-manifest can be accessed from a list of results. Referring to FIGS. 4A-4B, a sample e-manifest is shown. A user can review the e-manifest to ensure all information is correct, including SCNs. If the information appearing on the screen is correct, the shipment is ready to cross the border. An ACE manifest cover sheet may be printed by selecting a "print cover sheet" option 400. Referring to FIG. 4C, a sample e-manifest cover sheet is shown. If the information in ACE computer system e-manifest, the BSS, and each commercial invoice is correct and each SCN has an entry number, the driver may proceed to the border.

The present invention facilitates border crossings by generating documents that conform to import requirements as well as a buyer's corporate requirements. The manufacturer works with its suppliers and carriers to provide the information that is needed to generate accurate and timely customs documents thereby facilitating border crossings. The electronically enable clearance methodology streamlines the process of generating customs documents.

While certain embodiments of the present invention have been described in detail above for purposes of illustration, the scope of the invention is not to be considered limited by such disclosure, and modifications are possible without departing from the spirit of the invention as evidenced by the following claims:

The invention claimed is:

1. A computerized method for generating customs documents to facilitate border crossings comprising:
   (a) storing at a document processor computer database manufacturer price catalog data, said price catalog data comprising price data for parts ordered by a manufacturer from a plurality of suppliers;
   (b) storing at said document processor computer database manufacturer trade compliance data;
   (c) at said document processor computer for each of a plurality of parts shipments;
      (1) receiving at said document processor computer an advance shipment notice comprising parts shipment data;
      (2) assigning a shipment control number to said parts shipment data;
      (3) determining at said document processor computer a price for parts in said parts shipment, said price determined according to said manufacturer price catalog data in said document processor computer database;
      (4) generating at said document processor computer an electronic commercial invoice for said parts shipment said electronic commercial invoice comprising:
         (i) said price for parts in said parts shipment;
         (ii) trade data consistent with said manufacturer trade compliance data;
         (iii) an invoice number; and
         (vi) said shipment control number;
   (d) generating at said document processor computer an electronic manifest for said plurality of parts shipments, said manifest listing each of said shipment control numbers associated with said electronic commercial invoices;
   (e) transferring from said document processor computer to a border patrol computer said electronic manifest and said electronic commercial invoices for said plurality of shipments; and
   (f) receiving at said document processor computer from said border patrol computer accessing said electronic manifest with said list of shipment control numbers and each of said electronic commercial invoices associated with said shipment control numbers acceptance data for said electronic manifest for said plurality of shipments.

2. The computerized method of claim 1 wherein said acceptance data from said border patrol computer comprises an acceptance of said electronic manifest.

3. The computerized method of claim 1 wherein said acceptance data from said border patrol computer comprises a rejection of said electronic manifest.

4. The computerized method of claim 1 wherein said shipment control numbers comprise carrier identifying data.

5. The computerized method of claim 1 further comprising receiving from said border patrol computer at a manufacturer computer a notice of release of a vehicle following confirmation that border patrol requirements for permitting said manufacturer to import said parts shipments are met.

6. The computerized method of claim 1 wherein a document processor computer is controlled by a party selected from the group consisting of said manufacturer and an independent third party logistics provider.

7. The computerized method of claim 1 wherein storing at said document processor computer database manufacturer trade compliance data comprises storing harmonized system codes, NAFTA eligibility data, relationship data, and tax identification data.

8. A computerized method for generating customs documents to facilitate border crossings comprising:
   (a) storing at a document processor computer database manufacturer price catalog data comprising price data for parts ordered by a manufacturer from a plurality of suppliers;
   (b) storing at said document processor computer database manufacturer trade compliance data;
   (c) receiving at said document processor computer a plurality of advance shipment notices, each of said advance shipment notices associated with a parts shipment;
   (d) assigning at said document processor computer to each of said parts shipments a shipment control number uniquely identifying each of said parts shipments;
   (e) generating at said document processor computer an electronic commercial invoice for each of said parts shipments, said electronic commercial invoice comprising:
      (1) said shipment control number uniquely identifying said parts shipment;
      (2) an invoice number;
      (3) price data for said parts shipment consistent with said manufacturer price catalog data; and
      (4) trade data consistent with said manufacturer trade compliance data;
   (f) generating at said document processor computer an electronic manifest listing each of said shipment control numbers associated with said electronic commercial invoices; and
   (g) transferring from said document processor computer to a border control computer said electronic manifest with said list of shipment control numbers and each of said electronic commercial invoices associated with said shipment control numbers; and
   (h) receiving at said document processor computer from said border control computer acceptance data for said electronic manifest.

9. The computerized method of claim 8 wherein said acceptance data from said border patrol computer comprises an acceptance of said electronic manifest.

10. The computerized method of claim 8 wherein said acceptance data from said border patrol computer comprises a rejection of said electronic manifest.

11. The computerized method of claim 8 wherein said shipment control numbers comprise carrier identifying data.

12. The computerized method of claim 8 further comprising receiving from said border patrol computer at a manufacturer computer a notice of release of a vehicle following confirmation that border patrol requirements for permitting said manufacturer to import said parts shipments are met.

13. The computerized method of claim 8 wherein a document processor computer is controlled by a party selected from the group consisting of said manufacturer and an independent third party logistics provider.

14. The computerized method of claim 8 wherein storing at said document processor computer database manufacturer trade compliance data comprises storing harmonized system codes, NAFTA eligibility data, relationship data, and tax identification data.

15. A system for communicating customs document data to a customs agents to facilitate border crossings comprising:
- a first database comprising manufacturer price catalog data wherein said price catalog data comprises price data for parts ordered by a manufacturer from a plurality of suppliers;
- a second database comprising manufacturer trade compliance data;
- a document processor computer for receiving advance shipment notices comprising parts shipments data for parts shipments from said plurality of suppliers;
- an application at said document process computer for:
  - (a) assigning unique shipment control numbers to each of said parts shipments;
  - (b) generating an electronic commercial invoice for each of said parts shipments comprising said unique shipment control number, an invoice number, price data for said parts shipment consistent with said manufacturer price catalog data, and trade data consistent with said manufacturer trade compliance data; and
  - (c) generating at said document processor computer an electronic manifest, said manifest listing each of said shipment control numbers associated with said electronic commercial invoices;
- a communication link between said document processor computer and a border patrol computer;
- for transferring said electronic manifest and said electronic commercial invoices to said border patrol computer to receive from said border patrol computer a notification that vehicle carrying said part shipments has met border patrol requirements.

16. The system of claim 15 wherein said shipment control numbers comprise carrier identifying data.

17. The system of claim 15 further comprising a manufacturer computer that receives from said border control computer a notice of release of said vehicle following confirmation that border patrol requirements for releasing said vehicle are met.

18. The system of claim 15 wherein said document processor computer is controlled by a party selected from the group consisting of said manufacturer and an independent third party logistics provider.

19. The system of claim 15 wherein said manufacturer trade compliance data comprises harmonized system codes, NAFTA eligibility data, relationship data, and tax identification data.

20. The system of claim 15 wherein said electronic manifest comprises a trip identifier.

\* \* \* \* \*

UNITED STATES PATENT AND TRADEMARK OFFICE
CERTIFICATE OF CORRECTION

| | | |
|---|---|---|
| PATENT NO. | : 8,099,371 B1 | Page 1 of 1 |
| APPLICATION NO. | : 12/126693 | |
| DATED | : January 17, 2012 | |
| INVENTOR(S) | : Wade et al. | |

It is certified that error appears in the above-identified patent and that said Letters Patent is hereby corrected as shown below:

In column 16, line 12, please delete "computer;" and insert -- computer --.

In column 16, line 16, please delete "that vehicle" and insert -- that a vehicle --.

Signed and Sealed this
Thirteenth Day of March, 2012

David J. Kappos
*Director of the United States Patent and Trademark Office*